(12) United States Patent
Weber et al.

(10) Patent No.: US 6,609,795 B2
(45) Date of Patent: Aug. 26, 2003

(54) POLARIZING BEAM SPLITTER

(75) Inventors: Michael F. Weber, Shoreview, MN (US); Charles L. Bruzzone, Woodbury, MN (US); Peter D. Condo, Lake Elmo, MN (US); Kevin M. Hamer, St. Paul, MN (US); Timothy J. Hebrink, Oakdale, MN (US); William W. Merrill, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/878,575

(22) Filed: Jun. 11, 2001

(65) Prior Publication Data
US 2003/0016334 A1 Jan. 23, 2003

(51) Int. Cl.[7] .................. G03B 21/00; G03B 21/14; G02B 27/28; G02B 1/10; B32B 7/02
(52) U.S. Cl. ................. 353/20; 353/31; 353/33; 359/494; 359/495; 359/496; 359/500; 359/580; 359/586; 428/212
(58) Field of Search ............... 353/20, 31, 33; 359/584, 590, 494, 495, 500, 580, 583, 586, 985, 496; 428/212, 910, 430, 480, 483, 522, 523, 577, 580, 586, 587

(56) References Cited

U.S. PATENT DOCUMENTS

| | | | |
|---|---|---|---|
| 2,403,731 A | 7/1946 | MacNeille | 350/394 |
| 3,801,429 A | 4/1974 | Schrenk et al. | 161/181 |
| 4,525,413 A | 6/1985 | Rogers et al. | 428/212 |
| 5,094,788 A | 3/1992 | Schrenk et al. | 264/171 |
| 5,094,793 A | 3/1992 | Schrenk et al. | 264/171 |
| 5,882,774 A | 3/1999 | Jonza et al. | 428/212 |
| 5,912,762 A | 6/1999 | Li et al. | 359/352 |
| 5,962,114 A | 10/1999 | Jonza et al. | 428/212 |
| 6,057,961 A | 5/2000 | Allen et al. | 359/494 |
| 6,101,032 A | 8/2000 | Wortman et al. | 359/500 |
| 6,111,697 A | 8/2000 | Merrill et al. | 359/497 |
| 6,113,811 A | 9/2000 | Kausch et al. | 252/585 |
| 6,183,090 B1 * | 2/2001 | Nakanishi et al. | 353/20 |
| 6,210,785 B1 * | 4/2001 | Weber et al. | 428/212 |
| 6,296,927 B1 * | 10/2001 | Jonza et al. | 428/212 |
| 6,398,364 B1 * | 6/2002 | Bryars | 353/31 |
| 6,451,414 B1 * | 9/2002 | Wheatley et al. | 428/212 |

FOREIGN PATENT DOCUMENTS

| | | | |
|---|---|---|---|
| EP | 0 492 636 A1 | 7/1992 | H04N/9/31 |
| WO | WO 00/07043 | 2/2000 | G02B/5/30 |
| WO | WO 00/70386 | 11/2000 | G02B/27/28 |

OTHER PUBLICATIONS

U.S. patent application Ser. No. 09/878,559, Aastuen et al., filed Jun. 11, 2001.
ASTM D–1238–00 Standard Test6 Method for Melt Flow Rates of Thermoplastics by Extrusion Plastometer pp. 1–12.
ASTM D 1003–00 Standard Test Method for Haze and Luminous Transmittance of Transparent Plastics pp. 1–6.
ASTM D 3418–990 Standard Test Method for Transition Temperature of Plymers By Differential Scanning Calorimetry pp. 1–5.

* cited by examiner

Primary Examiner—Russell Adams
Assistant Examiner—Melissa J Koval (57) ABSTRACT

The present invention provides a unique polarizing beam splitter (PBS) that is suitable for use in projection systems and displays. The PBS contains at least one prism having at least one major surface and having a refractive index of at least about 1.6 and a birefringent film disposed on the major surface of the prism. The birefringent film is a multi-layer film having layers of at least a first material and a second material. After uniaxial stretching, the film exhibits a refractive index difference of less than about 0.15 units in the stretched direction.

41 Claims, 5 Drawing Sheets

POLARIZING BEAM SPLITTER

TECHNICAL FIELD

The present invention pertains to a polarizing beam splitter useful in, among other applications, a projection system. In particular, the polarizing beam splitter combines a prism of relatively high refractive index with a birefringent multi-layer film. The multi-layer film functions as a polarizer and contains at least two different materials, at least one of which exhibits birefringence after uniaxial orientation. The multi-layer film is selected so as to be stable to near UV and blue light.

BACKGROUND

For projection systems that use reflective liquid crystal display (LCD) imagers, a folded light path where the illuminating light beam and the projected image share the same physical space between a polarizing beam splitter (PBS) and an imager offers a compact design. Most reflective LCD imagers are polarization rotating, i.e., polarized light is either transmitted with its polarization state substantially unmodified for the darkest state or transmitted with its polarization state rotated to provide a desired gray scale. Thus, a polarized light beam is generally used as the input beam. Use of a PBS offers an attractive design because it can function to polarize the input beam and fold the light path.

A PBS is an optical component that splits incident light rays into a first (transmitted) polarization component and a second (reflected) polarization component. One common PBS is the MacNeille polarizer that discriminates between s and p-polarized light as described in U.S. Pat. No. 2,403,731 to MacNeille. In a MacNeille polarizer, the s-polarization is reflected and, over a narrow range of angles near the Brewster angle, the p-polarization is mostly transmitted. The p-component corresponds to light polarized in the plane of incidence. The s-component corresponds to light polarized perpendicular to the plane of incidence. The plane of incidence means a plane defined by a reflected light ray and a normal to the reflecting surface.

Some skilled in the art have devised other types of PBS. For example, U.S. Pat. No. 5,912,762 (Li et al.) discloses a thin film polarizing device that may be used in a PBS. The device has first and second light transmissive substrates in the form of prisms and a plurality of thin film layers disposed between the prisms. The thin film layers comprise high refractive index layers and low refractive index layers, the high refractive index layers having one or more different refractive indices and the low refractive index layers having one or more different refractive indices. The light transmissive substrates have a refractive index greater than the refractive index of each of the low refractive index layers. The prisms are shaped so as to allow incident light to strike upon the thin film layers at a plurality of angles greater than or equal to the critical angle (i.e., the angle that generates total internal reflection conditions) for the highest refractive index of the low refractive index layers. Like the MacNeille polarizer, the polarizer in U.S. Pat. No. 5,912,762 discriminates between s and p-polarized light, although in the latter, s-polarized light is transmitted and p-polarized light is reflected.

As another example, WO 00/70386, in FIG. 1, discloses a Cartesian PBS element 50 that includes a multi-layer birefringent film 52 encased in a glass cube 54, and oriented so as to reflect light incident with x-polarization (i.e., approximately s-polarization). See page 11, lines 9 to 11. The notation in WO 00/70386 publication is different in that y-polarization is said to be approximate to s-polarization. For incident rays of light in a large cone angle, the Cartesian PBS has been demonstrated to provide a higher contrast than a PBS that discriminates only on the basis of s-polarization vs. p-polarization.

The technology discussed thus far, although disclosing useful PBS using multi-layer films, may not be well suited for use in a projection system. In such a system, the PBS typically experiences high intensity of light from a wide range of wavelengths possibly for long periods of time. Although the inorganic based multi-layer films of U.S. Pat. No. 2,403,731 and U.S. Pat. No. 5,912,762 may be stable to high intensity blue light, they have deficiencies in angular performance needed in low f-number systems. What is needed to advance the art is a multi-layer film based PBS that has the durability to withstand the light source and simultaneously to provide contrast for incident light in large cone angles so that the resulting image of a projection system, when viewed by an observer, appears bright, sharp, distinct, and possesses crisp colors.

SUMMARY

Polarizing beamsplitters can be fabricated from birefringent polymeric multi-layer films, as disclosed in U.S. Pat. No. 5,962,114. Although many polymers exhibit a high transparency to visible light, many have strong absorption peaks in the near ultraviolet (UV) region. As a result, an absorption tail may extend into the visible portion of the spectrum. Although the percentage of absorbed light may be low, the absorbed energy in an intense light beam can result in over-heating of the film leading to thermal induced degradation of the polymer, light induced degradation or both. For some high index polymers, the absorption tail in the blue region is strong enough to impart a yellow color to the film. A key parameter in selecting polymers for a stable multi-layer PBS for high intensity projection systems is the proximity of their absorption edges to the visible spectrum.

The present invention provides a PBS that combines at least one high refractive index (i.e., greater than n=1.60) prism with a birefringent multi-layer film (sometimes referred to as "multi-layer film" for convenience). The multi-layer film functions as a polarizer. It contains alternating material layers that are stable when exposed to wavelengths associated with near UV light and blue light. These material layers are chosen based on their absorption spectrum within the visible spectrum and on the location of absorption edges in the UV and infrared (IR).

On the UV end of the spectrum, absorption edges for the material layers in the multi-layer film are preferably at least 40 nm less than, more preferably 50 nm less than, most preferably 60 nm less than the shortest wavelength that illuminates the PBS. For color projection displays, blue light below 420 nm can be rejected without substantially affecting the color balance or brightness of the display. Thus in a preferred embodiment, the shortest wavelength that illuminates the PBS is 420 nm. Depending on the light source, the preferred lower wavelength may be shorter, such as 410 nm, or somewhat higher, such as 430 nm. On the IR end of the spectrum, the absorption edges for the material layers in the multi-layer film are preferably at least 40 nm greater than, more preferably 50 nm greater than, most preferably 60 nm greater than the longest wavelength that illuminates the PBS. These considerations may exclude some combinations of materials that can be oriented to produce a high index difference between them in the x (stretched) direction.

Practical processing and environmental stability considerations may restrict the set of available materials to those that have a relatively small refractive index difference (i.e., less than 0.15 $\Delta n_x$) between them (in the x direction) after orientation.

In this document, the term "about" is presumed to modify each numerical recitation of a property such as, but not limited to, wavelength, refractive index, ratios, weight percentages, mole percentages. For example, a recitation of 500 nm for wavelength means about 500 nm. The term "pass axis" means the optical axis of transmission of the polarizer and corresponds to the y-axis or non-stretch direction of the multi-layer film. The term "extinction axis" means the axis of reflection of the polarizer and corresponds to the x-axis or stretch direction of the multi-layer film.

The term "absorption edge" means generally the wavelength at which the polymeric material becomes substantially opaque. A more precise definition is the wavelength at which the transmission, in air at normal incidence, is 10% for a 0.1 mm thick film. Each individual material layer in the multi-layer film has an x-direction, a y-direction, and a z-direction. The x-direction represents the stretch direction (also known as the "transverse direction" or "TD"), i.e., the direction in which the film is oriented. The y-direction represents a non-stretch direction (also known as "machine direction" or "MD"). The z-direction represents another non-stretch direction and is in the thickness direction of the individual layer.

Although two layers of different refractive indices are typically used in making the multi-layer film, it is within the scope of this invention to use more than two materials. Whereas a two-component multi-layer film presents a square wave index profile to the incident light wave, the optical repeating units in the multi-layer film need not present a square wave. Multiple material layers can be used to construct any periodic modulated index profile along the x direction while having substantially matched indices along the y and z directions. Alternatively, any continuously varying index profile such as, e.g., a rugate filter, can be used to make a birefringent polarizer. The continuously varying index can occur when the materials of a two-component system interdiffuse during processing. Similarly, a continuously varying index exists in cholesteric liquid crystal films.

The multi-layer film of the present invention need not be fabricated by coextrusion and orientation of polymeric materials, but may comprise birefringent organic crystalline layers that are constructed by techniques known in the art such as e.g. epitaxial vacuum deposition.

The material layers of the multi-layer film of the present invention need not have strictly orthogonal optic axes. The orientation of the axes may vary by several degrees from the orthogonal condition, e.g., up to 10°.

Because of its composition and construction, the inventive birefringent multi-layer film and the resulting PBS exhibit extended durability when exposed to the wide variety of light sources used in a projection system or a display. A typical light source includes a lamp and a reflector. Suitable lamps include xenon, incandescent, laser, light emitting diode (LED), metal halide arc light source, and high-pressure mercury light source. Such light sources can emit light in the blue and near ultraviolet wavelength. It is known that many polymeric-based films can degrade quickly when exposed to such wavelengths.

The inventive multi-layer film, when immersed or embedded in air or low refractive index (i.e., lower than 1.60) prism, exhibits a low contrast ratio (i.e., a contrast ratio of less than 100:1) due to the low difference in the values of the x direction index of refraction for the material layers. The "contrast ratio" means a ratio of two transmission values for light that have the planes of polarization parallel to the two orthogonal axes of the multi-layer film. The contrast ratio will depend on the nature of the beam in addition to the film. For example, the contrast ratio for a light beam in a cone of light distributed over a wide range of angles may be less than for a light beam distributed over a narrow cone of angles.

Advantageously, when immersing or embedding the multi-layer film in a high index (i.e., greater than 1.6 and less than an index that would create total internal reflection condition in the multi-layer film) prism, the contrast ratio increases substantially, on the order of greater than 100:1, preferably greater than 300:1, more preferably greater than 1000:1, when averaged over all rays of the incident cone of light. In one aspect, this advantage means that fewer layers may be required in the multi-layer film to achieve the desired contrast ratio. In general, the lower number of required layers can lead to a less complicated manufacturing process as compared to a similar film having a larger number of required layers. The combination of the multi-layer film embedded in the high index prism yields an improved PBS durable enough to withstand a typical light source used in many projection and display systems and yet provide excellent contrast. The index of the prism is preferably selected such that the highest incidence angles of incoming rays are close to, but not exceeding, the critical angle for total internal reflection (TIR).

Thus, in brief summary, the present invention provides a PBS comprising: (a) a birefringent film having a pass axis, the birefringent film comprising multi-layers of at least a first material layer and a second material layer, each material layers having an absorption edge in the visible spectrum such that in the ultraviolet region, the absorption edge is at least 40 nm less than the shortest wavelength of light that illuminates the polarizing beam splitter and in the infrared region, the absorption edge is at least 40 m greater than the longest wavelength of light that illuminates the polarizing beam splitter; and (b) at least one prism having a refractive index greater than 1.6 but less than a value that would create total internal reflection along the pass axis of the birefringent film. In a preferred embodiment, the shortest wavelength to illuminate the PBS is 420 nm and the longest wavelength is 680 nm. In this embodiment, the preferred absorption edges are at wavelengths less than 380 nm and greater than 720 nm.

Another embodiment of the invention is directed to an optical device, comprising: (a) the PBS described above, a first path being defined through the PBS for light in a first polarization state; and (b) at least one imager disposed to reflect light back to the polarizing beam splitter, portions of light received by the at least one imager being polarization rotated, polarization rotated light propagating along a second path from the imager and through the PBS.

Yet another embodiment of the invention is directed to a projection system that includes a light source to generate light, conditioning optics to condition the light from the light source and an imaging core to impose on image on conditioned light from the conditioning optics to form image light. The imaging core includes a PBS described above and at least one imager.

The present inventive PBS differs from the Cartesian PBS disclosed in WO 00/70386 in that the present invention identifies for the first time (1) the range of refractive index needed for the prism when using relatively low birefringence materials, (2) the wavelength ranges of absorption edges required for a suitably stable polymeric PBS multi-layer film and (3) available materials combinations that exhibit stability when exposed to near UV and blue light.

The present inventive PBS also differs from the PBS disclosed in U.S. Pat. No. 5,912,762. In that patent, it is disclosed that the transparent substrates, i.e., the prisms, have a refractive index greater than the refractive index of each of the low refractive index layers.

With the present invention, on the other hand, the prisms preferably have a refractive index higher than any of the refractive indices of any optical layer in the multi-layer film, but low enough so as not to produce a TIR condition along the pass axis of the birefringent multi-layer film polarizer. The term "optical layers" means those layers that participate in the reflection and transmission of the incident light. The internal angles of incidence at the multi-layer interfaces should be sufficiently high so that the interfacial reflectance coefficients at each layer are sufficiently large for x polarized light to produce an extinction ratio that meets required levels of 100:1, preferably 300:1, more preferably 1000:1. The required level of interfacial reflectance for a given wavelength of light can be calculated from the number of layers in the multi-layer film and the layer thickness distribution.

RELATED APPLICATION

Of related interest is the following U.S. Patent Application, filed concurrently with this application and by the assignee of this invention: "Projection System Having Low Astigmatism." Attorney Docket Number 56696USA5A.002, which is herein incorporated by reference.

BRIEF DESCRIPTION OF THE DRAWINGS

The invention will be further explained with reference to the drawings, wherein.

These figures are idealized, are not to scale, and are intended to be merely illustrative and non-limiting.

DETAILED DESCRIPTION

Figure 1:
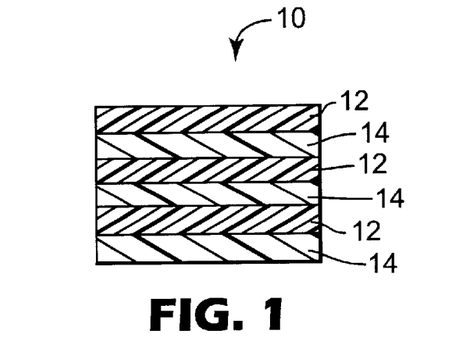
FIG. 1 is a cross-sectional view of an illustrative birefringent multi-layer film 10 in accordance with the invention.
Figure 2:
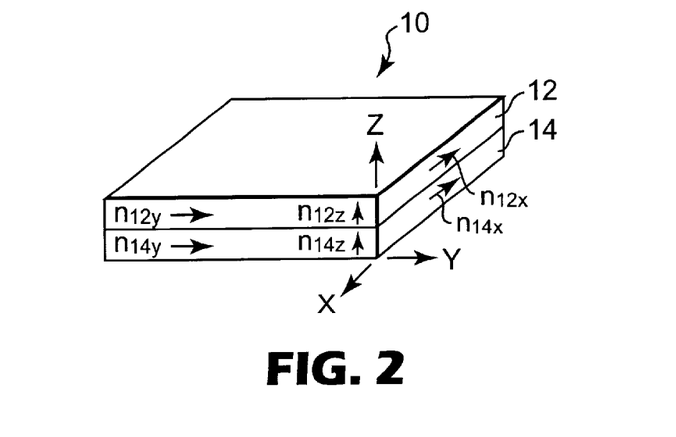
FIG. 2 is a perspective view of two material layers in an illustrative birefringent multi-layer film 10 in accordance with the invention.
Figure 3:
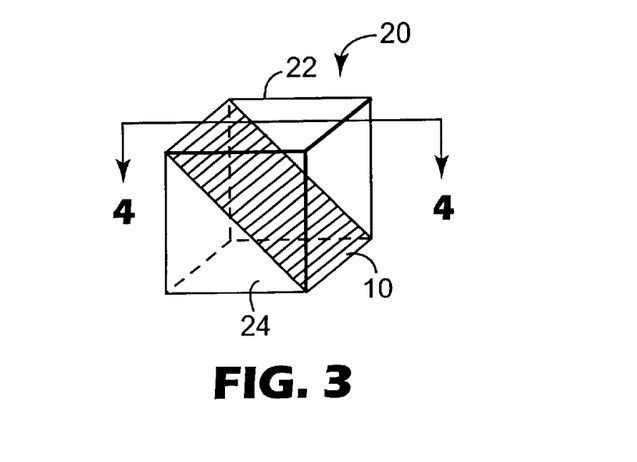
FIG. 3 is a perspective view of an illustrative polarizing beam splitter 20 in accordance with the invention.

FIG. 1 is a cross-sectional view of one illustrative birefringent multi-layer film 10 containing alternating layers of a first material layer 12 having a first set of refractive indices $n_{12x}$, $n_{12y}$, $n_{12z}$ and a second material layer 14 having a second set of refractive indices, $n_{14x}$, $n_{14y}$, and $n_{14z}$. FIG. 2 is a perspective view showing only two layers in a birefringent multi-layer film 10, with each layer having refractive indices in the x, y, and z directions. FIG. 3 is a perspective view of a PBS 20 having a first prism 22 and a second prism 24 positioned so as to form substantially a cube. The birefringent multi-layer film 10 is embedded along the diagonal of the cube, i.e., sandwiched between the hypotenuses of the prisms.

Figure 4A:
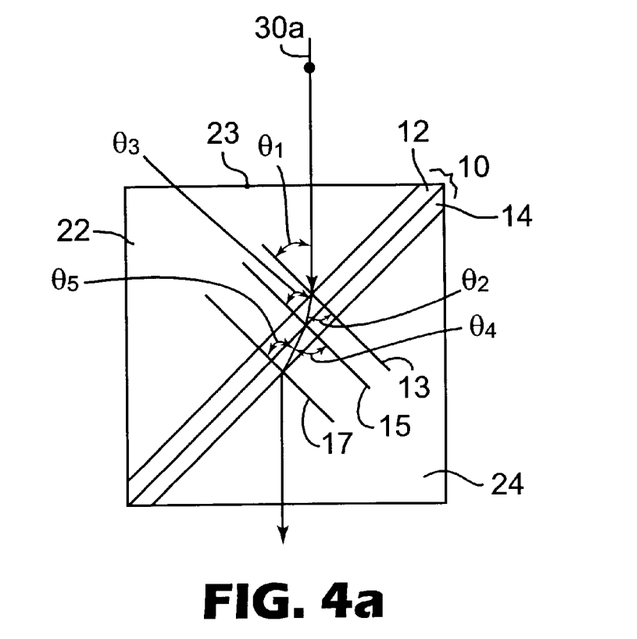
FIG. 4a and FIG. 4b are cross-sectional views taken along line 4—4 in FIG. 3.

FIG. 4a is a cross-sectional view along line 4—4 of FIG. 3 showing the path of an illustrative s-polarized incident light ray 30a in a simplified film comprising one high index layer and one low index layer. While actual films comprise hundreds of layers, this simplified film exemplifies the principles of operation of the polarizer. The multi-layer film 10 reflects primarily s-polarized light and transmits primarily p-polarized light. In operation, incident s-polarized light ray 30a travels from air ($n_{air}$=1.0) to the PBS 20 by first striking surface 23 of prism 22. This particular light ray happens to strike perpendicular to surface 23 and thus is transmitted into prism 22 with substantially no bending of ray 30a. In most applications, a cone of rays will be incident on surface 23. At surface 23, a portion of the incident light is reflected (not shown). Because of the position of film 10, ray 30a strikes layer 12 at 45° to normal 13 and because ray 30a travels from a high index material to a lower index material 12 ($n_{prism\ 22} > n_{12}$), as it is transmitted, it is bent away from normal 13. As ray 30a propagates from layer 12 to layer 14, having yet a lower refractive index (i.e., $n_{12} > n_{14}$), it again is bent away from normal 15. As ray 30a propagates out of layer 14 to prism 24, it travels from low index material to a high index material (i.e., $n_{prism\ 24} > n_{14}$), it bends towards normal 17 and exits the PBS as schematically shown. In practice, many pairs of layers are used and ray 30a gradually diminishes as it traverses the film, which preferably reflects most or all of ray 30a. Although $n_{prism}$ is preferably larger than $n_{12}$, it may be equal to or slightly less than $n_{12}$, depending on the magnitude of $\Delta n_x$, as described below. The prism refractive index should be larger than the refractive index of layer 14. The chosen cross section and incoming polarized ray 30a illustrate only the reflection axis (i.e., the extinction direction) of the PBS. Along the extinction axis, there will always be alternating low and high index layers.

At any dielectric material interface, the Fresnel reflective coefficient for s-polarized light increases monotonically with angle of incidence. The s-polarized light senses only the in-plane refractive indices of a film, and thus is not affected by the z refractive index of the film. One objective of the present invention is to provide for a PBS with high interior angles of incidence at the layer interfaces along the extinction axis of the birefringent multi-layer film so as to maximize the Fresnel reflection coefficients along the extinction axis and simultaneously provide a cube shape, which is preferred in most projection systems for compactness. Such an article can be devised by increasing the refractive index of the prisms that make up the cube. The limit to the prism index is determined by the need for high transmission along the pass axis of the multi-layer film polarizer as described below.

Figure 4B:
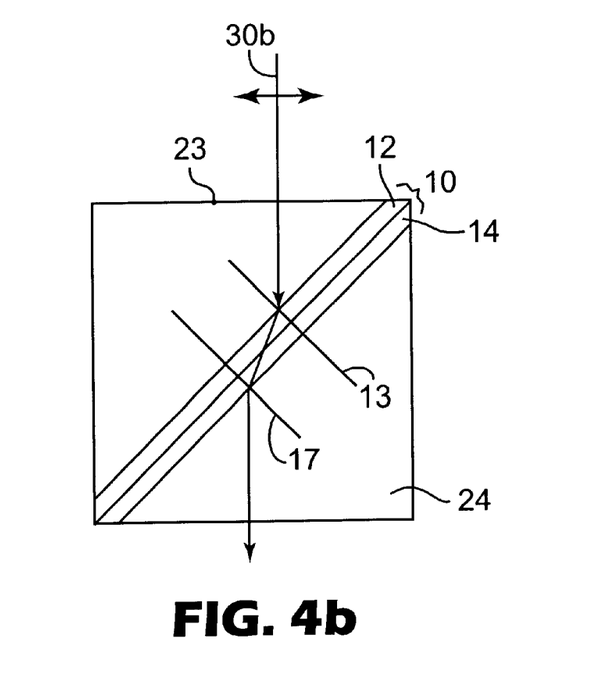

FIG. 4b is a cross-sectional view along line 4—4 of FIG. 3 showing the path of an illustrative p-polarized incident light ray 30b in a simplified film comprising only two layers. In this case, the ray 30b senses the y and z indices of the layers, the layer materials having been selected so that the y and z indices are substantially the same for all layers. At surface 23, a portion of the incident light is reflected (not shown). Because of the position of film 10, ray 30b strikes layer 12 at 45° to normal 13 and because ray 30b travels from a high index material to a lower index material 12 ($n_{prism\ 22} > n_{12}$), as it is transmitted, it is bent away from normal 13. As ray 30b propagates from layer 12 to layer 14, there is no substantial change in direction because the indices of the alternating layers are substantially matched for the polarization direction of ray 30b. As ray 30b propagates out of layer 14 to prism 24 and travels from low index material to a high index material (i.e., $n_{prism\ 24} > n_{14}$), it bends towards normal 17 and exits the PBS as schematically shown. The illustrated angle of propagation in layers 12 and 14 for FIG. 4b is the same as the angle of propagation in layer 14 in FIG. 4a.

The two figures, however, illustrate only one of three possible cases for the pass axis. Whereas the layer indices along the extinction (x) axis will alternate from high to low, the index along the pass (y) axis will be substantially the same for all layers, and can be either of the same low or high index value, or of some intermediate value, depending on whether the multi-layer film has (1) alternating positive birefringent and isotropic layers (referred to as "case 1"), (2) alternating negative birefringent and isotropic layers (referred to as "case 2") or (3) alternating negative and positive birefringent layers (referred to as "case 3").

FIGS. 4a and 4b illustrate case 1, which could occur with, e.g., a multi-layer film having uniaxially oriented polyethylene terephthalate (PET) and an isotropic material. In this case the optic axis of the PET layer is in the x direction. If the birefringent layer were a negative birefringent material such as uniaxially oriented syndiotactic polystyrene, then the alternating isotropic layer would be the high index layer, and the pass (y) direction index would have the higher index value. If the multi-layer film has alternating positive and negative birefringent materials, the y direction index would have a value intermediate to that of the low and high x direction indices.

One requirement for the PBS is to provide for high transmission values for the pass axis. For this reason, the index of the prisms should be low enough that the angle of propagation, illustrated as angles $\theta_2$ and $\theta_4$ in FIG. 4a, does not approach or exceed 90°, i.e., that a TIR condition does not exist for the incoming rays within the incident cone angle. As a practical matter, propagation angles approaching 90° are also to be avoided for several reasons. For example, an extremely high propagation angle along the pass axis will increase the amount of astigmatism in an image formed from the various rays in a cone of incident light, the lower angle rays having a considerable different lateral displacement than the rays with a higher angle of incidence to the multi-layer film. Extremely high propagation angles may also increase the amount of absorption and scattering of the incoming rays of light.

Therefore, the need for the highest propagation angles along the x direction should be balanced by the need for moderate propagation angles for the orthogonal polarization rays that are parallel to the y direction. For case 1 above, the highest propagation angles for rays polarized in the x direction are also the propagation angles for rays polarized along the y direction, and as such should be limited to a range of about 60° to 80°. For PET with an x index of 1.65 and y and z indices of 1.55, the prism index is preferably above 1.70 and more preferably above 1.80, but preferably less than about 1.90. The range of acceptable prism indices for a given birefringent multi-layer film depends on the value of the x index differential ($\Delta n_x$) and the cone angle of the incident rays. The propagation angles can be calculated using Snell's law. The transmission values along the x direction can be calculated using known optical multi-layer reflection algorithms.

With respect to case 2 above, the indices of the layers along the y axis equal the highest index in the multi-layer film and the propagation angle for rays polarized parallel to the y axis will be lower than that of case 1. Such an arrangement will decrease the amount of astigmatism, or alternatively, permit the use of even higher indices for the prisms, even to the point of TIR for rays such as 30a which are polarized parallel to the x direction.

A PBS that exhibits total internal reflection of all rays polarized in the x direction, but transmits all rays polarized in the y direction would be possible, given birefringent materials of the correct indices. The operation of such a PBS would be similar to that of a Glan-Thompson polarizer. Only a single birefringent layer would be needed, but in order to operate at 45° in a cube, the birefringence would have to be very high, on the order of or greater than 0.5.

Each of the components used to fabricate the inventive PBS and the method of assembling the PBS are discussed below in detail.

Prism

The prism can be constructed from any light transmissive material having a refractive index of at least 1.60, more preferably at least 1.70, and most preferably at least 1.80. The prism, however, should have a refractive index less than that which would create a total internal reflection condition, i.e., a condition where the propagation angle approaches or exceeds 90°. Such condition can be calculated using Snell's law. A "light transmissive" material is one that allows at least a portion of incident light, from the light source, to transmit. In some applications, the incident light can be filtered to eliminate the undesirable wavelengths. Suitable materials for use as prisms include, but are not limited to ceramic, glass, and polymers. Glass is understood to be a subset of ceramic. A particularly useful glass contains a metallic oxide such as lead, and such glass typically has refractive index greater than 1.60. A commercially available glass is PBH 55, available from Ohara, having a refractive index of 1.85 and has 75% lead oxide by weight.

In a projection system, such as a front or rear projection system, typically two substantially right angle triangular prisms will be used to form substantially a cube. In this case, the PBS is sandwiched between the hypotenuses of the two prisms using an attachment means, as discussed below. A cube-shaped PBS is preferred in most projection systems because it provides for a compact design, i.e., the light source and other components, such as filters, can be positioned so as to provide a small, lightweight, portable projector. For some systems, the cube-shaped PBS may be modified such that one or more faces are not square. If non-square faces are used, a matching, parallel face should be provided by the next adjacent component, such as the color prism or the projection lens.

Although a cube is one preferred embodiment, other PBS shapes can be used. For example, a combination of several prisms can be assembled to provide a rectangular PBS. Whatever that PBS shape, it needs to be of high index, it needs a birefringent multi-layer film functioning as a polarizer embedded in it, and it needs to produce high internal incidence angles for the polarization rays parallel to the x axis, as described above.

The prism dimension and thus the resulting PBS dimension depend upon the intended application. In an illustrative front projector, the PBS is a cube of 40 mm in length, width, and height with a 57 mm diagonal when using a small arc high pressure Hg type lamp, such as the UHF type sold commercially by Philips Corp., with its beam prepared as an F/2.2 cone of light and presented to the PBS cube for use with 0.78 inch diagonal imagers, such as the SXGA resolution imagers available from Three-Five Systems. The f/# of the beam, optical distance (i.e., sum of actual distances divided by the index of refraction for each unit of distance) separating the imager(s) from the PBS, and the imager size are some factors that determine the PBS size.

Multi-Layer Film

As discussed above, the birefringent multi-layer film has at least two materials of different refractive index. Preferably, for semicrystalline polymers, the following conditions should be satisfied to yield a useful film. The conditions enumerated below are merely the primary conditions that need to be satisfied. Other conditions, including but not limited to overall film thickness, are discussed separately.

One condition is that the refractive index in the y and z directions (non-stretch directions) of the first material, $n_{1y}$ and $n_{1z}$, be substantially similar to each other (i.e., within 5% of one another) and substantially similar to the refractive indices of the y and z directions of the second material, $n_{2y}$ and $n_{2z}$ respectively. Ideally, all four of these indices are identical but such precise matching is often difficult to achieve in practice. One method used to match the y and z indices within a layer is to impart a true uniaxial orientation. The phrase "true uniaxial orientation" means stretching the film in the x direction while allowing the film to relax in the y and z directions. It is by true uniaxial orientation that the y and z refractive indices can be substantially similar in a given layer. When the second material is chosen so that it matches the y index of the first material, z indices in the two layers must also match because the second material layers are also subjected to the same stretching conditions as the first material layer.

In many practical applications, a small z index mismatch between the layers is acceptable, depending on the internal incidence angle. The allowed magnitude of the z index mismatch between the layers is relative to the x index mismatch because the latter value determines the number of layers needed in a multi-layer film to produce the desired reflectivity. Ideally, for the birefringent multi-layer film immersed in a high index prism, the $\Delta n_y$ and $\Delta n_z$ between the various layers should be zero. In practice, it is difficult to produce a multi-layer film where $\Delta n_y$ and $\Delta n_z$ are zero. U.S. Pat. No. 5,882,774 describes how to compensate for the z index difference by manipulating the $\Delta n_y$. Some variation in $\Delta n_y$ and $\Delta n_z$ are acceptable for the practice of this invention. Thus, the ratio $\Delta n_z \div \Delta n_x$ and the ratio $\Delta n_y \div \Delta n_x$ are preferably less than 0.2, more preferably less than 0.1, and most preferably less than 0.05. Similarly, the difference between the y and z indices of a single layer is ideally zero. Thus birefringence within a layer $(n_y-n_z)$ should also be small compared to $\Delta n_x$. Thus, the ratio $(n_y-n_z) \div \Delta n_x$ is preferably less than 0.2, more preferably less than 0.1, and most preferably less than 0.05.

Another condition is that the first and second materials begin as isotropic materials (i.e., having substantially similar refractive indices in the x, y, and z directions) and after uniaxial orientation, at least one of the materials exhibits birefringence. Thus, there are three possible combinations: (1) the first material exhibits birefringence while the second material remains isotropic, (2) the first material remains isotropic while the second material exhibits birefringence, and (3) the first and second both exhibit birefringence. In a preferred embodiment, after uniaxial orientation, the first material is birefringent and experiences an increase in refractive index along the stretched direction while the second material remains isotropic and the refractive index difference between the first and second material is typically between 0.15 and 0.20 in the stretch direction.

Yet another condition is that the inventive multi-layer film should be stable, i.e., show minimal photo degradation, when exposed for long periods of time to wavelengths associated with near UV and blue light. When used in an illustrative front projector, with a PBS cube of 40 mm in length and width, and 57 mm diagonal when using a small arc high pressure Hg type lamp, such as the UHP type sold commercially by Philips Corp., with its beam prepared as an F/2.2 cone of light and presented to the PBS cube for use with 0.78 inch diagonal imagers, such as the SXGA resolution imagers available from Three-Five Systems, and with light below 420 nm filtered out with sharp band edge filters, the multi-layer film should preferably have lifetimes of at least 1000 hours and more preferably of at least 2000 hours. The multi-layer film should also exhibit low haze, low shrinkage over extended periods of time in the use environment, and good transparency.

Because of the requirements described above, very few polymeric materials are available for use. Suitable polymeric materials are discussed below.

Materials Selection

The multi-layer film is constructed with at least two different polymeric materials. In a preferred embodiment, the multi-layer film has alternating layers of a first polymer and a second polymer. For convenience, the first material layer is referred to as the "high index layer" while the second material layer is referred to as the "low index layer." These relative values refer to the indices observed along the x direction of the multi-layer film. As stated, useful polymers, for use as first or second layers, are those that are not susceptible to photo degradation to light with wavelengths in the near ultraviolet and blue region of the visible spectrum. Preferably, useful polymers should have an absorption edges ≦360 and ≧750 nm range. Many high index polymers, such as polyethylene napthalate (PEN), have an absorption edge in the range of 385 nm. The absorption tail from this edge can cause significant absorption into the visible spectrum. For PEN, the absorption tail for a 130 µm thick sample film is 2.5% at 400 nm wavelength, and drops to substantially zero at around 450 nm to 500 nm. For this reason illumination of PEN with intense blue light can lead to significant degradation of the film, causing a severe yellowing of the polymer.

A suitable and preferred polymer for use as the high index layer is polyethylene terephthalate (PET). The absorption edge of PET is 320 nm, which essentially eliminates photo degradation with blue light. After uniaxial orientation, the PET film has a refractive index of 1.68 in the stretched (x) direction and 1.54 in the non-stretch (y and z) directions.

It is possible to admix small quantities of PEN with PET to stabilize against crystallinity changes and increase the refractive index for improved optical performance in the case when lower index prisms are used. Preferably, the admixture of the PEN and PET is the form of a transesterified copolymer resulting from in situ extrusion of the two polymers. These small admixtures (typically less than 50 mol % PEN) have been observed to have lower wavelength absorption edges than pure PEN. For example, a polyester with 20% admixed PEN has an absorption edge at 374 nm compared to 385 nm for pure PEN. The wavelength where a film containing 20 mol % PEN in PET absorbs substantially no light is 420 mm compared to 450 nm for the pure PEN. Thus, for application where substantially no light is present at wavelengths less than 420 nm, the 80 mol % PET/20 mol % PEN material used as the high index layer provides the advantage of minimal photo degradation.

On the UV end of the spectrum, a suitable absorption edge of the material layers in the multi-layer film and the PBS is preferably at less than 380 nm, more preferably less than 370 nm, and even most preferably less than 360 nm. On the IR end of the spectrum, a suitable absorption edge of material layers in the multi-layer film and the PBS is preferably greater than 720 nm, more preferably greater than 730 nm, and most preferably greater than 740 nm.

Suitable polymers for use as the low index layer when PET is used as the high index layer are as follows. It is desirable for the low index polymers to remain isotropic upon uniaxial orientation at typical PET draw temperatures. Thus, the low index polymers preferably have a glass transition temperature below that of PET (i.e., less than 80° C.). In order to remain isotropic, these polymers preferably also have sufficient irregularity to prevent them from crystallizing during the orientation process and in the end use application. Even greater polymer backbone irregularity is desriable than what is normally required to prevent polymer crystallization when the end use application is above the glass transition temperature of the polymers. For optical performance of the multi-layer film, these polymers preferably have an isotropic refractive index in the range of 1.535 to 1.555, more preferably 1.540 to 1.550. The description below describes suitable copolyesters useful as low refractive index materials when PET is used as the high refractive index material.

The low refractive index polymers preferably have the following properties: (1) thermal stability at PET melt processing, (2) UV stable or UVA protectable, (3) high clarity (i.e., high transmission and low absorption), (4) rheological properties close enough to PET for stable flow during coextrusion, (5) good interlayer adhesion with PET, (6) low dispersion, and (7) drawability (i.e., the ability to be oriented) without birefringence.

It has been discovered that copolyesters comprising terephthalate and cyclohexane dicarboxylate as carboxylate comonomer subunits, and ethylene glycol, cyclohexane dimethanol, and trimethylol propane as glycol comonomer subunits are particularly useful as low index polymers multi-layer films containing PET as the high index polymer. The copolyesters have can be blended with polyethylenecyclohexanedimethanolterephthalate (PCTG), available from Eastman Chemical Co.

Branching comonomers such as neopentyl glycol (NPG) and 2-butyl 2-ethyl 1,3-propanediol (BEPD) can be copolymerized into the above copolyester for increased polymer backbone irregularity and reduced polymer packing ability to suppress crystallization of the copolyester. It has been discovered, through crystallization rate studies conducted at 90° to 120° C., that the copolyesters containing NPG, and especially BEPD remain free from haze and crystallinity far longer than the above described copolyesters without the branching comonomers.

Suitable comonomers for use in copolyester (coPET) or the like may be of the diol or dicarboxylic acid or ester type. Dicarboxylic acid comonomers include but are not limited to (1) terephthalic acid, (2) isophthalic acid, (3) phthalic acid, (4) all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), (5) bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, (6) halogenated aromatic dicarboxylic acids such as 2-chloroterephthalic acid and 2,5-dichloroterephthalic acid, (7) other substituted aromatic dicarboxylic acids such as tertiary butyl isophthalic acid and sodium sulfonated isophthalic acid, (8) cycloalkane dicarboxylic acids such as 1,4-cyclohexanedicarboxylic acid and its isomers and 2,6-decahydronaphthalene dicarboxylic acid and its isomers, (9) bi- or multi-cyclic dicarboxylic acids such as the various isomeric norbornane and norbornene dicarboxylic acids, adamantane dicarboxylic acids, and bicyclo-octane dicarboxylic acids, (10) alkane dicarboxylic acids such as sebacic acid, adipic acid, oxalic acid, malonic acid, succinic acid, glutaric acid, azelaic acid, and dodecane dicarboxylic acid, and (11) any of the isomeric dicarboxylic acids of the fused-ring aromatic hydrocarbons (such as indene, anthracene, pheneanthrene, benzonaphthene, fluorene and the like). Alternatively, alkyl esters of these dicarboxylic acids listed above, such as dimethyl terephthalate, may be used.

Suitable diol comonomers include but are not limited to (1) linear or branched alkane diols or glycols such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols, (2) ether glycols such as diethylene glycol, triethylene glycol, and polyethylene glycol, (3) chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, (4) bi- or multicyclic diols such as the various isomeric tricyclodecane dimethanols, norbornane dimethanols, norbornene dimethanols, and bicyclo-octane dimethanols, (5) aromatic glycols such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers, and (6) lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

In one preferred embodiment, the coPET comprises the following comonomers: 5 to 45 mol % 1,4-dimethylterephthalate, 5 to 45 mol % 1,2-ethane diol, 5 to 45 mol % 1,4-dimethylcyclohexanedicarboxylate, 5 to 45 mol % 1,4-cyclohexanedimethanol, 0.5 to 5 mol % trimethylol propane, 0 to 10 mol % neopentyl glycol, and 0 to 10 mol % 2-butyl 2-ethyl 1,3 propanediol. The mole percentages (mol %) are based on the total comonomer composition.

Syndiotactic polystyrene (sPS) can also be used as the low index polymer. Uniaxially oriented sPS is negatively birefringent and has a refractive index differential of 0.08 to 0.09 for visible light. Along the x direction, the oriented sPS becomes the low index material, and a suitable isotropic material can be used for the high index layer. The required index for the isotropic material is on the order of 1.62.

Other polymer materials can be used as first and second material layers so long as the criteria discussed herein have been satisfied.

Method of Making Multi-Layer Film

The multi-layer film can be made using a coextrusion process and then oriented either in line or as a separate operation. The multi-layer film typically contains about 800 to 1000 layers of alternating high index and low index materials. In brief summary, the coextrusion process involves the following steps.

A first and second extruder deliver meltstreams of the first and second polymer materials to a feedblock. U.S. Pat. No. 3,801,429 describes an exemplary and useful feedblock. The feedblock creates optical layers of alternating first material and second material. In some embodiments, the feedblock creates protective boundary layers (PBL), which can be of the first material, the second material, or a different third material. In general, the PBL function to protect the optical layers as the multi-layer film is processed through the feedblock and do not function as optical layers. The PBL could protect both major surfaces of the multi-layer film or just one surface.

After leaving the feedblock, the material stream passes through a multiplier. In general, the multiplier splits the material stream into two streams and recombines them by stacking one on the other. This process doubles the total number of layers. U.S. Pat. Nos. 5,094,788 and 5,094,793 describe exemplary and useful multipliers. More than one multiplier can be used. The multiplier may be symmetric, meaning it splits the incoming stream in equal portions or asymmetric, meaning it splits the incoming stream in unequal portions. Each portion is known as a packet of layers. The volume ratio of the unequal packets is known as the multiplier ratio. The thickness of each layer in the first packet is increased in the second packet by this multiplier ratio. In this manner, the wavelength range of the multi-layer film can be extended by creating a wider range of layer thickness values.

In some embodiments, after the multiplier, a third extruder adds outside polymeric skin layers to the material stream. The outside skin layers can provide features, such as protecting the multi-layer film during subsequent processing (e.g., minimize possibility of scratching) and aid in the uniaxial stretching process, all of which are described below. Skin layers could be of the first material (high index), second material (low index), third material (PBL), or a different polymer. Suitable polymers for skin layers include PET, coPET, polyethylene, and polypropylene (PP). Skin layers are not optical layers. If desired, and with suitable materials selection such that the skin layer does not bond strongly to the PBL, the skin layers can be removed from the final multi-layer film before assembly in the prisms.

After the multiplier, the material stream is passed through a film die and the resulting extrudate is directed onto a casting wheel. Typically, the casting wheel is cooled, e.g., with chilled water. Typically, a high voltage pinning system is used to pin the extrudate to the casting wheel. As the extrudate cools on the casting wheel, the multi-layer film forms. The resulting multi-layer film contains at least alternating layers of first and second materials (i.e., the optical layers). Optionally, the multi-layer film additionally contains PBL and/or outside skin layers.

To obtain an orientation of the cast web in the TD direction that allows for relaxation (contraction) in the MD direction, small pieces must be oriented individually as there is no commercially available tenter that allows for contraction of a continuous web in the MD. The cast web pieces may be oriented in a commercial tenter, or by using specialized part orienters such as the KARO IV from Bruckner German Technology, Germany.

As stated above, the outside skin layers (referred to as "skins" for convenience) can provide many features, especially when used during the orienting process. Due to the added film thickness that the skins provide, the film's bending stiffness is increased. In this manner, the skins can help minimize wrinkling during the stretching process. During post-processing, e.g., during wind-up, in storage, and future converting steps, the skins act as a protective layer.

Figure 6:
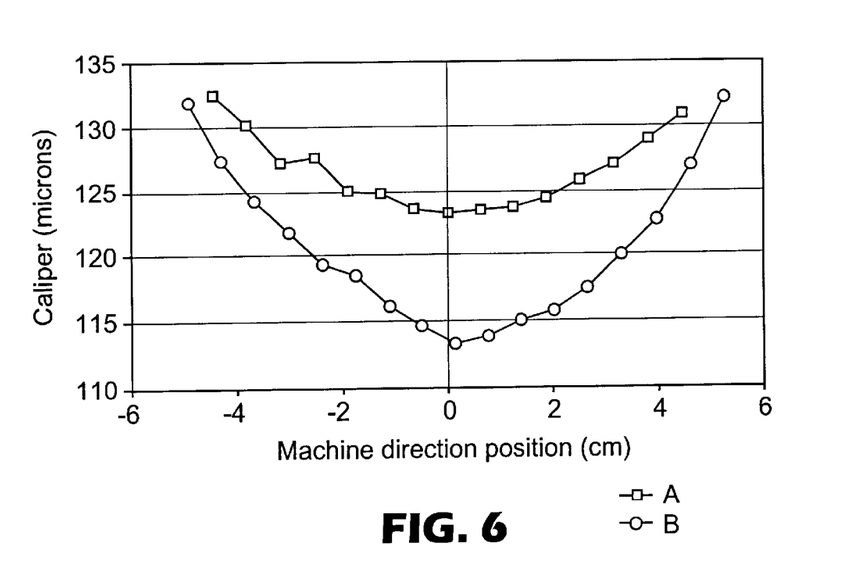
FIG. 6 is a graph plotting the film thickness as a function of film position after uniaxial orientation.

In some embodiments, the skins may be responsible for achieving uniform film thickness, which can affect the optical performance of the multi-layer film. FIG. 6 illustrates one particular example, described in detail below in Example 2. The graph shows the film thickness as a function of various positions along the film along the stretched direction (MD) for a multi-layer film stretched with skins (curve A) and without skins (curve B). A value of zero on the x-axis indicates the center of the film. The total film width, in MD, is 10.5 cm for the film of curve B and about 9.0 cm for the film of curve A, indicating that certain skin materials can aid in obtaining more dimensional relaxation in the non-stretch direction.

In a preferred embodiment, the skins contain crystalline isotactic polypropylene homopolymers or more preferably, a crystalline propylene containing copolymer. The melting point of the skin layer resin is 120° to 160° C., preferably 120° to 150° C., and more preferably 120° to 140° C. according to differential scanning calorimetry (DSC) measurement. The skin layer resin typically has a melt flow index of 7 to 18 g/10 minutes, preferably 10 to 14 g/10 minutes as measured according to ASTM D1238-95 ("Flow Rates of Thermoplastics by Extrusion Plastometer") at a temperature of 230° C. and a force of 21.6N.

The crystalline propylene containing copolymer used in the skin layers includes copolymers of propylene and ethylene or alpha-olefin materials having between 4 to 10 carbon atoms, such that the propylene content of the copolymer is greater than 90% by weight. Ethylene-propylene copolymers having an ethylene content of 4 to 7% by weight are particularly preferred. The term "copolymer" includes not only the copolymer, but also terpolymer and polymers of four or more component polymers. Preferably, the copolymer is a random copolymer.

The skin layer resin may also include additives and other components as is known in the art such as antioxidants, stabilizers, neutralizers, plasticizers, colorants, lubricants, processing aids, nucleating agents, ultraviolet light stabilizing agents, antistatics, and other property modifiers in an amount effective for each case.

One suitable skin layer resin is an ethylene-propylene random copolymer resin having a melt flow index of 11 g/10 minutes and a melting point of 134° C., commercially available under the product designation 8650 from Atofina Petrochemicals, Inc., Houston, Tex.

In some embodiments, the use of a propylene containing copolymer in the skin layers may be responsible for achieving a film with low haze, as measured according to ASTM D1003 ("Haze and Luminous Transmittance of Transparent Plastics"). After the stretching process, the skin layers are removed, and haze values are preferably less than 5%.

In a preferred embodiment, the skins are removed from the multi-layer film before it is assembled into the PBS. By removing the skins, the final film thickness is reduced, thereby minimizing undesirable astigmatism. FIG. 4b shows the displacement of incoming ray 30b as it travels through the PBS. As the film thickness decreases, the displacement also decreases thereby minimizing astigmatism.

Assembly of PBS

Once fabricated, the multi-layer film can be embedded in the high refractive index prisms to yield a PBS as described generally in the following method.

A first amount adhesive is dispensed and evenly distributed to a first side of the multi-layer film typically while a vacuum chuck holds the film. Any adhesive can be used as long as its refractive index lies as close as possible to that of the multi-layer film in the machine direction (the transmission or y direction). The reflection from the interface between the hypotenuse of the prism and the adhesive can be suppressed by the use of an antireflective coating, but the reflection from the interface between the adhesive and the film cannot be controlled in this way, due to the difficulty of applying such a coating to the polymeric film. For this reason, the index difference between the film and the adhesive should be less than 0.05, and preferably less than 0.02. Photoinitators can be added to the adhesive making it light curable. With the adhesive exposed, the first prism is disposed thereon so as to achieve as uniform adhesive thickness as possible. Dispensing a controlled volume of adhesive in a pattern and using a controlled amount of force to place the prism onto the film can achieve uniform adhesive thickness. The adhesive, when wet, has a thickness from 0.01 to 0.1 mm, preferably about 0.05 mm. The adhesive is cured securing the first side of the multi-layer film to the first prism. If photoinitiators had been added to the adhesive, the light sources used to cure the adhesive is positioned parallel to the exposed sides of the prisms, i.e., at 45° to the film. A second amount of adhesive is dispensed and evenly distributed on to a second (now exposed) side of the multi-layer film. The second prism is disposed thereon such that, again, there is uniform adhesive thickness. The second portion of adhesive is then cured to finish the PBS assembly. In a preferred embodiment, the multi-layer film is slightly longer in length than the prisms' hypotenuses. It is also preferred to assemble the PBS in an environment equipped with high efficiency particulate air (HEPA) filtration. One skilled in the art can devise an automated process to accomplish this assembling process.

In a preferred embodiment, the adhesive comprises 98 parts by weight of liquid photopolymer, commercially available as product number NOA61 (from Norland Company, Cranbury, N.J.) and 2 parts by weight of phosphine oxide initiator, commercially available as LUCRIN TPO-L (from BASF). With such an adhesive, lamps emitting about 400 nm lights are placed on the exposed sides of the prisms. At a 0.05 mm wet thickness, the cure time is 1 to 2 minutes. After the entire PBS is assembled, if desired, it can be post cured under a nitrogen blanket using halogen lamps for a period of time, e.g., 10 minutes. The PBS can be placed in a 45° C. forced air oven for 12 hours to increase the adhesion between the multi-layer film and the prisms.

If desired, the prism surface upon which the film is to be laminated (typically the hypotenuse) is surface modified to increase adhesion. Exemplary surface modifications include corona treatment (with air, nitrogen, or other appropriate gases) and plasma treatment. If desired, a least one of the prism's surfaces can be antireflective coated.

An adhesive attachment means as described above is one exemplary attachment means. Other attachment means are possible.

Applications

The inventive polarizing beam splitter finds utility as one component in an optical imagining system. The term "optical imaging system" includes front and rear projection systems, projection displays, head-mounted displays, virtual viewers, head up displays, optical computing, optical correlation, and other similar optical viewing and display systems.

Figure 5:
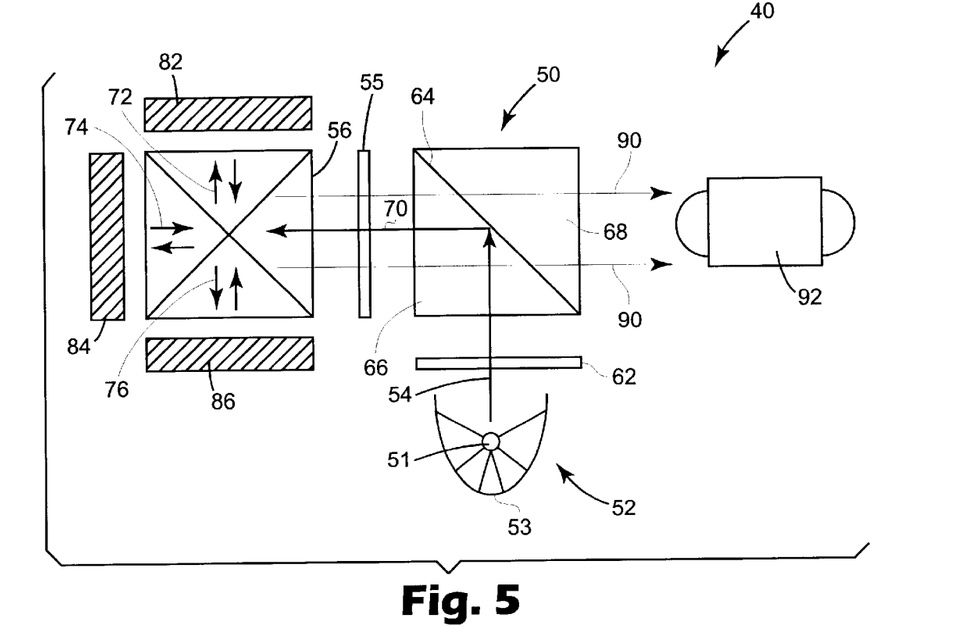
FIG. 5 is a schematic view of an illustrative optical system 40 useful in a projection system in accordance with one aspect of the invention.

FIG. 5 illustrates an optical display or imaging system 40 including a light source 52 providing a light beam 54. The light source 52 includes a lamp 51 and a reflector 53. The light beam 54 passes through illumination optics 62, which may pre-polarize the light. The light beam 54 then impinges on PBS 50, which includes birefringent multi-layer film 64 embedded in two prisms 66 and 68 making up cube 50. Film 64 is oriented so as to reflect s-polarized light. Polarized beam 70 is directed towards a color splitter/combiner prism 56 that splits the polarized beam 70 into three sub-beams 72, 74, and 76. The three sub-beams 72, 74, and 76 are reflected and modulated off red, green, and blue reflective imagers 82, 84, and 86 respectively. A controller, not shown, can be coupled to the imagers 82, 84, and 86, to control their operation. Typically, the controller activates different pixels of the imagers to create an image in the reflected light. The reflected and modulated sub-beams are recombined by the combiner 56 into combined beams 90. The modulated components of the combined beams 90 pass through PBS 50 and are projected as an image by projection lens 92. The optical display 40 can be used to fabricate a compact front or rear projection system.

The conditioning optics 62 change the characteristics of the light emitted by the source 52 to characteristic that are desired by projection system. For example, the conditioning optics 62 may alter the divergence of the light, the polarization state of the light, and the spectrum of the light. The conditioning optics 62 may include for example, one or more lenses, a polarization converter, a pre-polarizer, and/or a filter to remove unwanted ultraviolet or infrared light. In some embodiments, the conditioning optics 62 may have a low f-number, for example equal to or less than 2.5, in order to use a large fraction of the light from the light source 52.

Figure 7:
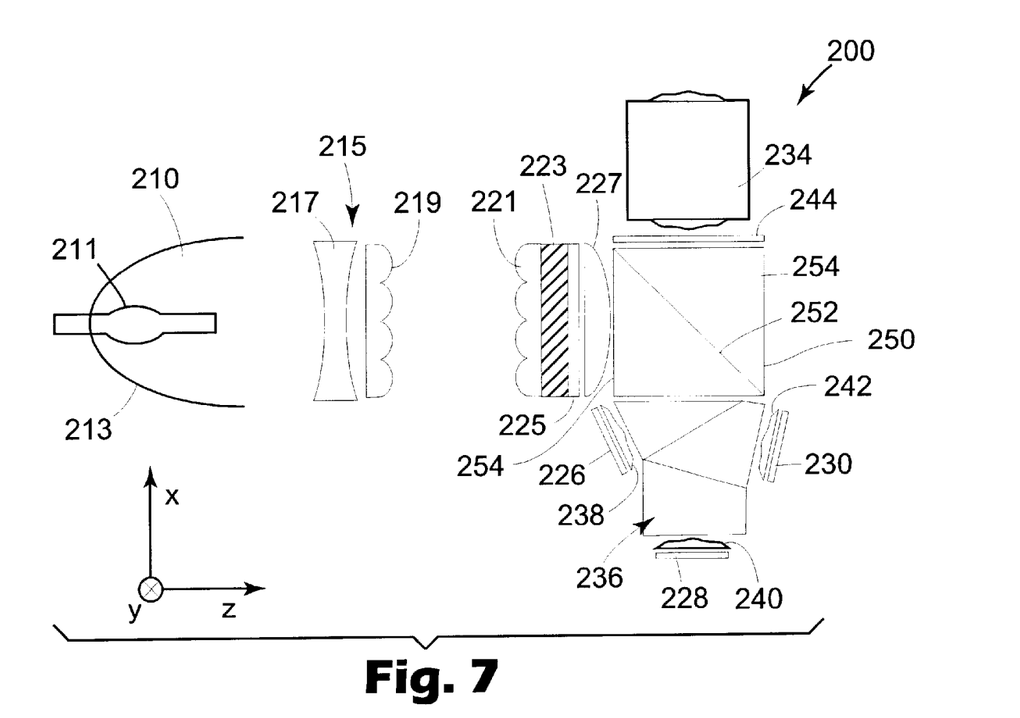
FIG. 7 is a schematic view of a projection unit based on multiple reflective images in accordance with one aspect of the invention.

Another embodiment of a projection system 200 is illustrated in FIG. 7. The system uses a light source 210, such as an arc lamp 211 having a curved reflector 213, which directs light towards the illumination optics 215. In the illustrated embodiment, the conditioning optics 215 include a collimating lens 217, a first lenslet array 219, a second lenslet array 221 and a condensing lens 227. Between the second lenslet array 221 and the condensing lens 227, the conditioning optics 215 may include an optional polarization converter 223, for example of the Geffkcken-type design. Depending on the conversion efficiency of the polarization converter 223, it may be advantageous to include an optional pre-polarizer 225 following the polarization converter 223. The pair of lenslet arrays 219 and 221 receives nominally collimated light from the collimating lens 217. The polarization converter 223 and the prepolarizer 225 polarize the light incident on the PBS 250 in the desired polarization state. It will be appreciated that the illumination optics may include more or fewer optical components than those described for this particular embodiment. The lenslet arrays 219 and 221, and the condensing lens 227, shape and homogenize the light in order to illuminate the reflective imagers 226, 228 and 230 evenly. The PBS 250 redirects the s-polarized light towards the three reflective imagers 226, 228 and 230.

In a multiple-imager system, a color prism 236 separates the light into separate color bands associated with each imager. For the three-imager configuration illustrated, the color prism 236 typically separates the light into primary color bands: red green and blue. Intervening lenses, such as field lenses 238, 240 and 242, may be inserted between each imager and the color prism 236 to further optimize the optical response of the system. The imagers 226, 228 and 230 modulate the polarization state of the light upon reflection to varying degrees, depending on particular image information. The color prism 236 then recombines the red, green and blue images and passes the combined image light to the PBS 250, which analyzes the polarization state of the image by passing substantially only p-polarized light. The s-polarized light is redirected back to the light source 212. The light that passes through the PBS 250 is collected by the projection lens system 234 and may be subsequently focused to a screen (not shown) for viewing. An optional post-polarizer 244 may be inserted between the PBS 250 and the projection lens system 234. It will be appreciated that other optical configurations may be used with multiple imagers.

EXAMPLES

The following examples are provided to illustrate different embodiments and details of the invention. Although the examples serve this purpose, the particular ingredients and amounts used as well as other conditions and details are not to be construed in a manner that would unduly limit the scope of this invention. Unless otherwise specified, all percentages are in weight percent.

Determination of Glass Transition Temperature ($T_g$)

Where applicable in the preparatory examples below, the $T_g$ was measured by DSC in accordance with ASTM D3418 with a scanning rate of 20° C./minute and removal of the thermal history by taking the second heat $T_g$.

TABLE 1

Abbreviations

| Chemical Abbreviation | Chemical Description |
|---|---|
| BEPD | 2-butyl 2-ethyl 1,3-propanediol |
| CHDM | 1,4-cyclohexanedimethanol |
| DMCD | 1,4-dimethylcyclohexanedicarboxylate |
| DMT | 1,4-dimethylterephthalate |
| EG | 1,2-ethane diol |
| NPG | neopentyl glycol |
| TMP | trimethylol propane |
| PCTG | polyethylenecyclohexanedimethanolterephthalate |

Preparatory Example 1

This example describes the synthesis of a copolyester, conveniently labeled as coPET-A, for use as the low index layer in the multi-layer film. The components listed in Table 2 were charged into a batch reactor. Under pressure of 0.20 MPa, this mixture was heated to 254° C. while removing methanol. After 45.5 kg of methanol was removed, 52 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.84 dL/g, as measured in 60/40 wt. % phenol/o-dichlorobenzene, was produced. The chemical structure below is descriptive of coPET-A.

Preparatory Example 2

This example describes the synthesis of a copolyester, conveniently labeled as coPET-C, for use as the low index layer in the multi-layer film. The components listed in Table 2 were charged into a batch reactor. Under pressure of 0.20 MPa, this mixture was heated to 254° C. while removing methanol. After 4.1 kg of methanol was removed, 52 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.82 dL/g, as measured in 60/40 wt. % phenol/o-dichlorobenzene, was produced.

Preparatory Example 3

This example describes the synthesis of a copolyester, conveniently labeled as coPET-D, for use as the low index layer in the multi-layer film. The components listed in Table 2 were charged into a batch reactor. Under pressure of 0.20 MPa, this mixture was heated to 254° C. while removing methanol. After 35.4 kg of methanol was removed, 57 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.82 dL/g, as measured in 60/40 wt. % phenol/o-dichlorobenzene, was produced.

Preparatory Example 4

This example describes the synthesis of a copolyester, conveniently labeled as coPET-E, for use as the low index layer in the multi-layer film. The components listed in Table 2 were charged into a batch reactor. Under pressure of 0.20 MPa, this mixture was heated to 254° C. while removing methanol. After 33.2 kg of methanol was removed, 38 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.81 dL/g, as measured in 60/40 wt. % phenol/o-dichlorobenzene, was produced.

Preparatory Example 5

A coPET, conveniently labeled as coPET-B, was made using a 50/50 by weight blend of coPET A and PCTG. NMR and $T_g$ data were not available for this example.

Table 2: Components for Selected Preparatory Examples of coPET

TABLE 2

Components for Selected Preparatory Examples of coPET

| Components | Prep Ex 1 coPET-A | Prep Ex 2 coPET-C | Prep Ex 3 coPET-D | Prep Ex 4 coPET-E |
|---|---|---|---|---|
| DMT (kg) | 69.1 | 12.3 | 74.5 | 70.5 |
| DMCD (kg) | 75.5 | 4.4 | 32.7 | 30.9 |
| CHDM (kg) | 8.2 | 5.5 | 30.9 | 29.1 |
| EG (kg) | 98.2 | 2.9 | 53.2 | 42.7 |
| TMP (kg) | 0.73 | 0.1 | 0.7 | 0.8 |
| NPG (kg) | 0 | 0 | 4.5 | 0 |
| BEPD (kg) | 0 | 0 | 0 | 13.2 |
| zinc acetate (g) | 35 | 4.3 | 35 | 40 |
| cobalt acetate (g) | 20 | 4.3 | 25 | 0 |
| antimony acetate (g) | 50 | 8.0 | 50 | 50 |
| RESULTS (NMR) | | | | |
| mol % DMT | 25 | 37 | 38 | na |
| mol % DMCD | 25 | 13 | 12 | na |
| mol % CHDM | 4 | 23 | 14 | na |
| mol % EG | 45.5 | 26.5 | 34.3 | na |
| mol % TMP | 0.5 | 0.5 | 0.5 | na |
| mol % NPG | 0 | 0 | 1.2 | na |
| mol % BEPD | 0 | 0 | 0 | na |
| $T_g$ (° C.) | 46 | 64 | 62 | 57 |

The coPET examples above were tested in a forced air convection oven at various temperatures to determine the haze level, if any, due to crystallinity. Each sample was tested for 100 hours. The haze level was determined visually with "none" meaning greater than 90% transmission of incident light indicating very low or near zero haze, "low" meaning greater than 75% transmission indicating low haze, "medium" meaning greater than 50% transmission indicating medium haze, and "high" meaning less than 25% transmission indicating high haze. All the percentages were qualitative. After testing, each sample was compared to a control sample, i.e., a sample that has not been exposed in the oven, for the qualitative determination of the amount of haze. The haze data is shown in Table 3 below.

TABLE 3

| CoPET Sample | Haze level due to crystallinity developed after 100 hours at the following temperatures | | | | |
|---|---|---|---|---|---|
| | 80° C. | 90° C. | 100° C. | 110° C. | 120° C. |
| CoPET-A | none | none | low | low | low |
| CoPET-B | none | low | medium | high | high |
| CoPET-C | none | low | medium | high | high |
| CoPET-D | none | none | none | low | low |
| CoPET-E | none | none | none | none | none |

Example 1

A multi-layer film containing 896 layers was made via a coextrusion and orientation process where PET was the first, high index material and coPET was the second, low index material. A feedblock method (such as that described by U.S. Pat. No. 3,801,429) was used to generate about 224 layers with a layer thickness range sufficient to produce an optical reflection band with a fractional bandwidth of 30%. An approximate linear gradient in layer thickness was produced by the feedblock for each material with the ratio of thickest to thinnest layers being 1.30.

PET with an intrinsic viscosity (IV) of 0.74 dl/g was delivered to the feedblock by one extruder at a rate of 56.8 kg/hr and coPET-B (as described in Preparatory Example 5 above) was delivered by another extruder at the same rate.

These meltstreams were directed to the feedblock to create 224 alternating layers of PET and coPET-B with the two outside layers of coPET-B serving as the PBL through the feedblock. The PBL were much thicker than the optical layers, the former containing about 20% of the total melt-flow of the coPET-B (10% for each side).

The material stream then passed though an asymmetric two times multiplier (as described in U.S. Pat. Nos. 5,094,788 and 5,094,793). The multiplier thickness ratio was about 1.25:1. Each set of 224 layers has the approximate layer thickness profile created by the feedblock, with overall thickness scale factors determined by the multiplier and film extrusion rates. The material stream then passed though a second asymmetric two times multiplier with a multiplier ratio of about 1.55:1.

After the multipliers, outside skin layers of polypropylene (PP) (Atofina Petrochemicals, Inc., product no. 8650) were added to the meltstream. The PP was fed to a third extruder at a rate of 28.6 kg/hour. Then the material stream passed through a film die and onto a water-cooled casting wheel. The inlet water temperature on the casting wheel was 8° C. A high voltage pinning system was used to pin the extrudate to the casting wheel. The pinning wire was about 0.10 mm thick and a voltage of about 6.4 kV was applied. The pinning wire was positioned manually by an operator 3 to 5 mm from the web at the point of contact to the casting wheel to obtain a smooth appearance for the resulting multi-layer film. The casting wheel speed was adjusted for precise control of final film thickness.

The PP extruder and associate melt process equipment were maintained at 254° C. The PET and coPET-B extruders, the feedblock, skin-layer modules, multiplier, die and associated melt process equipment were maintained at 266° C.

A 7 inch by 10 inch (17.8×25.4 cm) sample of the multi-layer film was fed into a standard film tenter for uniaxial stretching. The cast web piece was gripped by the tenter clips on the edges as for continuously oriented films. The film near the clips cannot contract in the MD because the spacing between the tenter clips are fixed, but because the web was not constrained on the leading and trailing edges, it contracted in the MD, the contraction being larger the greater the distance from the clips. With large enough aspect ratios, the center of the sample is able to filly contract for a true uniaxial orientation, i.e., where the contraction was equal to the square root of the TD stretch ratio.

The sample was stretched in the TD with an initial clip distance of 8 inches (20.3 cm) to a final clip distance of 56 inches (142 cm) then allowed to relax, at the stretch temperature, to 51 inches (129.5 cm). The stretching was done at a tenter temperature of 98.9° C. at a stretch ratio of 6:1 and a stretch rate of 5 cm/sec. The initial to final part size was not the same as the stretch ratio (6:1) because of the unstretched material within the clips.

The uniaxially oriented multi-layer film was cut into a 39 mm by 58 mm part. This part was laminated between two 45° glass prisms of 1.85 refractive index such that the film lies along the hypotenuse. Each prism had two 40 mm bases with a 57 mm hypotenuse. All exposed surfaces of the prisms were previously coated with an anti-reflective coating.

In order to obtain experimental values for the extinction of the PBS, the film was laminated with only one component of a two component epoxy so that the bond would not be permanent, in order to allow for reuse of the prisms.

Figure 8:
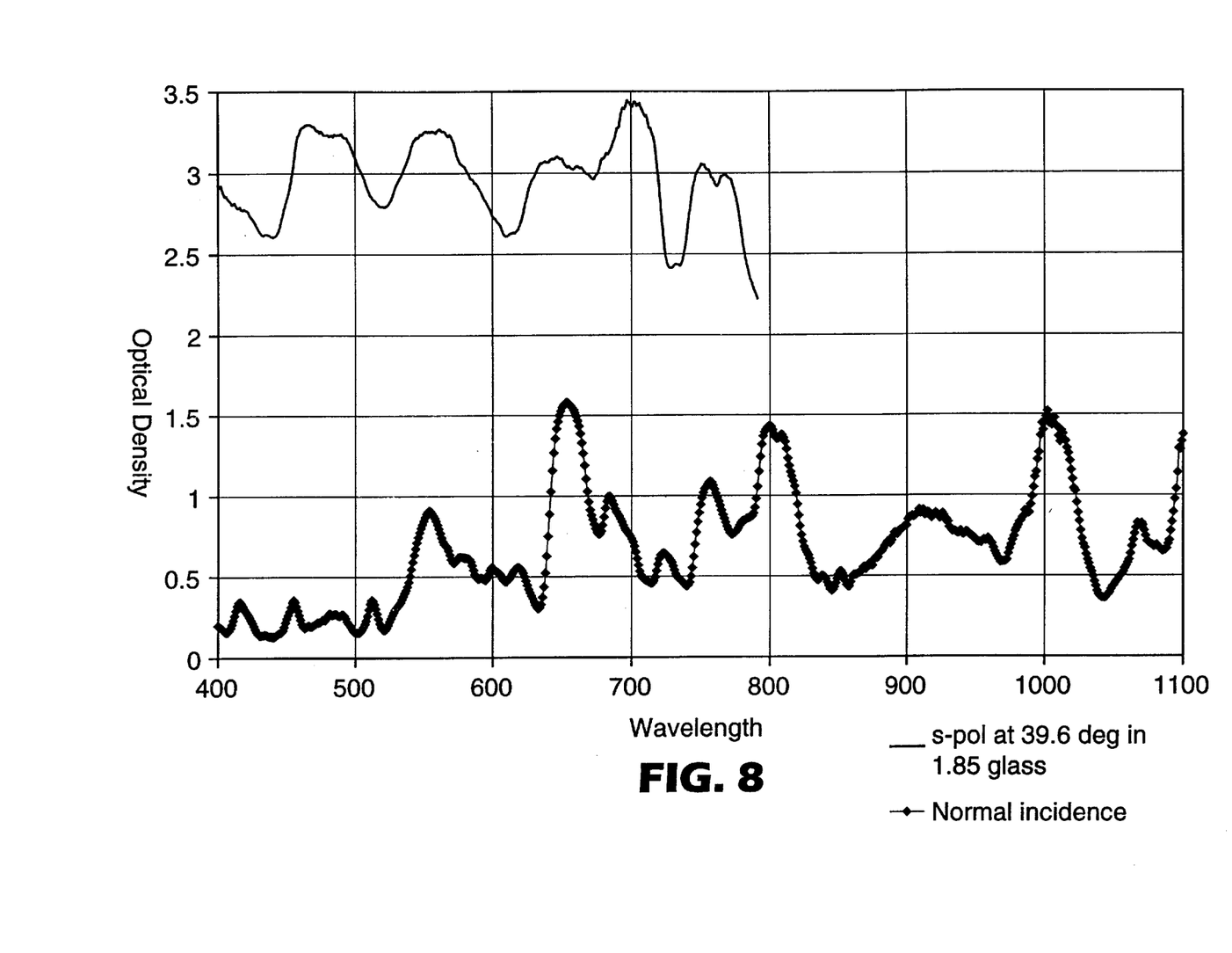
FIG. 8 is a graph of optical density versus wavelength for the polarizing beam splitter of Example 1.

The resulting PBS was measured in a Perkin Elmer Lambda-19 spectrophotometer (available from Perkin Elmer Instruments, Norwalk, Conn.) with the cube face oriented at −10° to the incident light beam. The negative angle referred to incidence angles less than 45 degrees to the film in the cube. For a cube of index 1.85, −10° corresponded to a 39.6° angle of incidence on the film. The spectrophotometer beam was polarized with a Glan-Thompson polarizer, oriented so that s-polarized light was incident on the film in the cube. The measurement generated an extinction spectrum, or optical density of the PBS ($-\log_{10}$ of the transmission) as shown in FIG. 8. The average extinction was about 3.0, corresponding to a contrast of 1000:1. Plotted on the same graph was the extinction spectrum of a bare film in air at normal incidence. FIG. 8 shows a significant increase in extinction for the film measured in air when compared to the extinction obtained at a relatively low angle in the PBS. For incident light at −13° to the PBS face, or 38° to the multi-layer film, the contrast decreased but was still above 300:1. For normal incidence and positive angles of incidence on the PBS face, the film's reflectivity is theoretically higher, but no significant increase was measured on the Lambda-19 instrument. This result may be due to the residual level of scattered light from the PBS film, or from the noise level of the spectrophotometer. In FIG. 8, "s-pol" means s-polarized.

The measured haze of the film after removal of the skins was only 1.4%, compared to about 15% in example 2 below. The skins used in this example have a low melting temperature (134° C., compared to the melting temperature of the skins of example 2. Haze was measured with the Haze-Gard Plus instrument from BYK-Gardner, Columbia, Md.

Shrinkage was 0.13% after 15 minutes at 85° C.

Example 2

This example exemplified a 90/10 coPEN/PETG multi-layer film with and without PP skins. FIG. 6 shows some of the advantages of using skin layers during uniaxial orientation.

A PBS was made according to Example 1 except for the following changes. In the multi-layer film, the high index material was a copolymer of polyethylene napthalate and PET at a weight ratio of 90 to 10 respectively (referred to as 90/10 coPEN for convenience) and the low index material was PETG (polyethylenecyclohexanedimethanolterephthalate) commercially available from Eastman Chemicals Company.

The 90/10 coPEN was delivered to the feedblock by one extruder at a rate of 39 kg/hr and the PETG was delivered by another extruder at a rate of 63 kg/hr. These meltstreams were directed to the feedblock to create the coPEN and PETG optical layers with the two outside layers of PETG serving as the PBL through the feedblock.

After the multipliers, outside skin layers of PP (Atofina Petrochemicals Inc., product no. 3652) were added using a third extruder at a rate of 45.5 kg/hr The melt process equipment was maintained at 266° C.

The multi-layer cast web containing the optical layers and PETG PBL was 0.32 mm thick (without skin). The skin layers were 0.038 mm on each side. The multi-layer cast webs with skins and without skins were cut into 10 inch by 10 inch (25.4 cm×25.4 cm) samples and oriented in a tenter at 138° C. with a stretch ratio of 6 to 1. The effect of skin layers on MD relaxation is illustrated by the graphs in FIG. 6. A 10 by 10 inch samples stretched with the propylene skins exhibited a more uniform film thickness, and a final MD dimension which is smaller than samples of the same starting size, but stretched without skins. The increased contraction provides for a smaller difference between $n_y$ and $n_z$ in the birefringent layers.

Samples were also cut to 7 by 10 inches and fed into the tenter with the 7 inches in the MD direction. The samples without PP skins wrinkled with few exceptions, whereas those with the PP skins yielded flat film specimens. After removal of the skins after stretching, the measured haze of the film was about 15%, measured with the Haze-Gard Plus. It is believed that most of this haze is due to the surface roughness imparted by the skins, and it can be greatly reduced via index matching of the film's outer PBL and the adhesive used to laminate the film to the prisms. For the same index match, however, a much lower haze can be obtained using the skin material of example 1.

Shrinkage was 0.13% after 15 minutes at 85° C.

Example 3

A multi-layer film containing 896 layers was made via a coextrusion and orientation process where the in situ extrusion transesterified result of feeding a 20 mol % PEN and 80 mol % PET mixture was the first, high index material and coPET B was the second, low index material. A feedblock method (such as that described by U.S. Pat. No. 3,801,429) was used to generate about 224 layers with a layer thickness range sufficient to produce an optical reflection band with a fractional bandwidth of 30%. An approximate linear gradient in layer thickness was produced by the feedblock for each material with the ratio of thickest to thinnest layers being 1.30.

PET with an initial intrinsic viscosity (IV) of 0.74 dl/g was fed into an extruder at the rate of 43.1 kg/hr and PEN with an initial intrinsic viscosity of 0.50 dl/g was simultaneously fed into the same extruder at the rate of 13.7 kg/hr. The transesterified mixture of PET and PEN was delivered to the feedblock by this extruder at a combined rate of 56.8 kg/hr and coPET-B (as described in Preparatory Example 5 above) was delivered by another extruder at 56.8 kg/hr.

These meltstreams were directed to the feedblock to create 224 alternating layers of a transesterified mixture of PET and PEN and coPET-B with the two outside layers of coPET-B serving as the PBL through the feedblock. The PBL were much thicker than the optical layers, the former containing about 20% of the total meltflow of the coPET-B (10% for each side).

The material stream then passed though an asymmetric two times multiplier (as described in U.S. Pat. Nos. 5,094, 788 and 5,094,793). The multiplier thickness ratio was about 1.25:1. Each set of 224 layers has the approximate layer thickness profile created by the feedblock, with overall thickness scale factors determined by the multiplier and film extrusion rates. The material stream then passed though a second asymmetric two times multiplier with a multiplier ratio of about 1.55:1.

After the multipliers, outside skin layers of polypropylene (PP) (Atofina Petrochemicals, Inc., product no. 3652) were added to the meltstream. The PP was fed to a third extruder at a rate of 28.6 kg/hour. Then the material stream passed through a film die and onto a water-cooled casting wheel. The inlet water temperature on the casting wheel was 8° C. A high voltage pinning system was used to pin the extrudate to the casting wheel. The pinning wire was about 0.10 mm thick and a voltage of about 6.4 kV was applied. The pinning wire was positioned manually by an operator 3 to 5 mm from the web at the point of contact to the casting wheel to obtain a smooth appearance for the resulting multi-layer film. The casting wheel speed was adjusted for precise control of final film thickness.

The PP extruder and associate melt process equipment were maintained at 254° C. The PET/PEN and coPET-B extruders, the feedblock, skin-layer modules, multiplier, die and associated melt process equipment were maintained at 266° C.

A 7 inch by 10 inch (17.8×25.4 cm) sample of the multi-layer film was fed into a standard film tenter for uniaxial stretching. The cast web piece was gripped by the tenter clips on the edges as for continuously oriented films. The film near the clips cannot contract in the MD because the spacing between the tenter clips are fixed, but because the web was not constrained on the leading and trailing edges, it contracted in the MD, the contraction being larger the greater the distance from the clips. With large enough aspect ratios, the center of the sample is able to fully contract for a true uniaxial orientation, i.e., where the contraction was equal to the square root of the TD stretch ratio.

The sample was stretched in the TD with an initial clip distance of 8 inches (20.3 cm) to a final clip distance of 56 inches (142 cm) then allowed to relax, at the stretch temperature, to 51 inches (129.5 cm). The stretching was done at a tenter temperature of 102.8° C. at a nominal stretch ratio of 6:1 and a stretch rate of 5 cm/sec. The final draw ratio was about 6.3 in the central portion of the part due to slightly less drawing near the clips, actively cooled to 52° C.

The uniaxially oriented multi-layer film was cut into a 39 mm by 58 mm part. This part was laminated between two 45° glass prisms of 1.85 refractive index such that the film lies along the hypotenuse. Each prism had two 40 mm bases with a 57 mm hypotenuse. All exposed surfaces of the prisms were previously coated with an anti-reflective coating.

Optical performance was similar to the film of example 1. Shrinkage was 0.13% after 15 minutes at 85° C.

All references cited herein, including those listed in the Background section, are incorporated by reference in each reference's entirety.

What is claimed is:

1. A polarizing beam splitter comprising:
   (a) a birefringent film having a pass axis, the birefringent film comprising a plurality of first material layers and a plurality of second material layers, each of the first and second material layers having a first absorption edge less than about 380 nm and a second absorption edge greater than about 720 nm; and
   (b) at least one prism comprising a base adjacent a first major surface of the birefringent film, wherein the at least one prism comprises a refractive index greater than 1.6.

2. The polarizing beam splitter of claim 1, wherein the at least one prism comprises a first right angle prism and a second right angle prism, wherein the first right angle prism and the second right angle prism are positioned so as to form substantially a cube and the birefringent film is disposed between the two prisms so as to lie along the diagonal of the cube.

3. The polarizing beam splitter of claim 1, wherein the at least one prism is glass, polymer, or ceramic.

4. The polarizing beam splitter of claim 1, wherein each first material layer is a polymer selected from a group consisting of polyethylene terephthalate and a transesterified copolymer of polyethylene terephthalate and polyethylene napthalate.

5. The polarizing beam splitter of claim 4, wherein the transesterified copolymer of polyethylene terephthalate and polyethylene napthalate contains less than 50 mol % polyethylene napthalate, based on the total first material.

6. The polarizing beam splitter of claim 1, wherein each second material layer is selected from a group consisting of copolyester and syndiotactic polystyrene.

7. The polarizing beam splitter of claim 6, wherein the copolyester comprises 1,4-dimethylterephthalate, 1,2-ethane diol, 1,4-dimethylcyclohexanedicarboxylate, 1,4-cyclohexanedimethanol, and trimethylol propane.

8. The polarizing beam splitter of claim 7, wherein the copolyester further comprises neopentyl glycol and 2-butyl 2-ethyl 1,3-propanediol.

9. The polarizing beam splitter of claim 8, wherein the copolyester comprises about 5 to 45 mol % 1,4-dimethylterephthalate, about 5 to 45 mol % 1,2-ethane diol, about 5 to 45 mol % 1,4-dimethylcyclohexanedicarboxylate, about 5 to 45 mol % 1,4-cyclohexanedimethanol, about 0.5 to 5 mol % trimethylol propane, about 0 to 10 mol % neopentyl glycol, and about 0 to 10 mol % 2-butyl 2-ethyl 1,3-propanediol.

10. The polarizing beam splitter of claim 1 having a contrast ratio greater than about 300 to 1.

11. The polarizing beam splitter of claim 1 having a contrast ratio greater than 1000 to 1.

12. The polarizing beam splitter of claim 1 further comprising an attachment means disposed between the at least one prism and the birefringent film.

13. The polarizing beam splitter of claim 12, wherein the attachment means is an adhesive having a refractive index within 0.05 units of that of the film in the light transmitting direction.

14. The polarizing beam splitter of claim 12, wherein the attachment means is an adhesive having a refractive index within 0.02 units of that of the film in the light transmitting direction.

15. The polarizing beam splitter of claim 1, wherein at least one of the material layers exhibits birefringence.

16. The polarizing beam splitter of claim 1, wherein the the first absorption edge is less than about 370 nm and the second absorption edge is greater than about 730 nm.

17. The polarizing beam splitter of claim 16, wherein the first absorption edge is less than about 360 nm and the second absorption edge is greater than about 740 nm.

18. An optical device, comprising:
   (a) the polarizing beam splitter of claim 1, a first path being defined through the polarizing beam splitter for light in a first polarization state; and
   (b) at least one imager disposed to reflect light back to the polarizing beam splitter, portions of light received by the at least one imager being polarization rotated, polarization rotated light propagating along a second path from the image and through the polarizing beam splitter.

19. The optical device of claim 18, further comprising a light source to generate the light and light conditioning optics to condition the light before reaching the polarizing beam splitter.

20. The optical device of claim 18, further comprising a projection lens system to project image light from the at least one imager.

21. A projection system, comprising:
   (a) a light source to generate light;
   (b) conditioning optics to condition the light from the light source;
   (c) an imaging core to impose an image on conditioned light from the conditioning optics to form image light, the imaging core including the polarizing beam splitter of claim 1 and at least one imager; and (d) a projection lens system to project the image light from the imaging core.

22. A polarizing beam splitter, comprising:

a birefringent film having a pass axis, wherein the birefringent film comprises a plurality of first material layers and a plurality of second material layers, wherein each of the first and second material layers comprises an absorption edge, wherein the absorption edge is less than 380 nm; and at least one prism comprising a base adjacent a first major surface of the birefringent film, wherein the at least one prism comprises a refractive index less than 1.9.

23. The polarizing beam splitter of claim 22, wherein the at least one prism comprises a first right angle prism and a second right angle prism, wherein the first right angle prism and the second right angle prism are positioned so as to form substantially a cube, and further wherein the birefringent film is positioned between the first right angle prism and the second right angle prism so as to lie along the diagonal of the cube.

24. The polarizing beam splitter of claim 22, wherein the at least one prism comprises glass, polymer, or ceramic.

25. The polarizing beam splitter of claim 22, wherein each first material layer is a polymer selected from a group consisting of polyethylene terephthalate and a transesterified copolymer of polyethylene terephthalate and polyethylene napthalate.

26. The polarizing beam splitter of claim 25, wherein the transesterified copolymer of polyethylene terephthalate and polyethylene napthalate contains less than 50 mol % polyethylene napthalate, based on the total first material.

27. The polarizing beam splitter of claim 22, wherein each second material layer is selected from a group consisting of copolyester and syndiotactic polystyrene.

28. The polarizing beam splitter of claim 27, wherein the copolyester comprises 1,4-dimethylterephthalate, 1,2-ethane diol, 1,4-dimethylcyclohexanedicarboxylate, 1,4-cyclohexanedimethanol, and trimethylol propane.

29. The polarizing beam splitter of claim 28, wherein the copolyester further comprises neopentyl glycol and 2-butyl 2-ethyl 1,3-propanediol.

30. The polarizing beam splitter of claim 29, wherein the copolyester comprises about 5 to 45 mol % 1,4-dimethylterephthalate, about 5 to 45 mol %, 1,2-ethane diol, about 5 to 45 mol % 1,4-dimethylcyclohexanedicarboxylate, about 5 to 45 mol % 1,4-cyclohexanedimethanol, about 0.5 to 5 mol % trimethylol propane, about 0 to 10 mol % neopentyl glycol, and about 0 to 10 mol % 2-butyl 2-ethyl 1,3-propanediol.

31. The polarizing beam splitter of claim 22, having a contrast ratio greater than about 300 to 1.

32. The polarizing beam splitter of claim 22, having a contrast ratio greater than 1000 to 1.

33. The polarizing beam splitter of claim 22, further comprising an attachment means disposed between the prism and the birefringent film.

34. The polarizing beam splitter of claim 33, wherein the attachment means is an adhesive having a refractive index within 0.05 units of that of the film in the light transmitting direction.

35. The polarizing beam splitter of claim 33, wherein the attachment means is an adhesive having a refractive index within 0.02 units of that of the film in the light transmitting direction.

36. The polarizing beam splitter of claim 22, wherein at least one of the material layers exhibits birefringence.

37. An optical device, comprising:

(a) the polarizing beam splitter of claim 22, a first path being defined through the polarizing beam splitter for light in a first polarization state; and (b) at least one imager disposed to reflect light back to the polarizing beam splitter, portions of light received by the at least one imager being polarization rotated, polarization rotated light propagating along a second path from the image and through the polarizing beam splitter.

38. The optical device of claim 37, further comprising a light source to generate the light and light conditioning optics to condition the light before reaching the polarizing beam splitter.

39. The optical device of claim 37, further comprising a projection lens system to project image light from the at least one imager.

40. A projection system, comprising:

(a) a light source to generate light;

(b) conditioning optics to condition the light from the light source;

(c) an imaging core to impose an image on conditioned light from the conditioning optics to form image light, the imaging core including the polarizing beam splitter of claim 22, and at least one imager; and (d) a projection lens system to project the image light from the imaging core.

41. A projection system, comprising:

(a) a light source to generate light;

(b) conditioning optics to condition the light from the light source;

(c) an imaging core to impose an image on conditioned light from the conditioning optics to form image light, wherein the imaging core comprises a polarizing beam splitter and at least one imager, wherein the polarizing beam splitter comprises:

a birefringent film having a pass axis, the birefringent film comprising a plurality of first material layers and a plurality of second material layers, each of the first and second material layers having a first absorption edge and a second absorption edge, wherein the first absorption edge is at least 40 nm less than the shortest wavelength of the light illuminating the polarizing beam splitter, and further wherein the second absorption edge is at least 40 nm greater than the longest wavelength of the light illuminating the polarizing beam splitter; and at least one prism comprising a base adjacent a first major surface of the birefringent film, wherein the at least one prism comprises a refractive index of greater than 1.6; and (d) a projection lens system to project the image light from the imaging core.

\* \* \* \* \*

UNITED STATES PATENT AND TRADEMARK OFFICE
CERTIFICATE OF CORRECTION

PATENT NO. : 6,609,795 B2
DATED : August 26, 2003
INVENTOR(S) : Weber, Michael F.

It is certified that error appears in the above-identified patent and that said Letters Patent is hereby corrected as shown below:

Column 9,
Line 1, delete "the UHF type" and insert in place thereof -- the UHP type --.

Column 20,
Line 46, delete " to filly contract" and insert in place thereof -- to fully contract --.

Signed and Sealed this

Second Day of March, 2004

JON W. DUDAS
*Acting Director of the United States Patent and Trademark Office*